No. 860,238. PATENTED JULY 16, 1907.
A. PARKER-SMITH.
SLACK ADJUSTER.
APPLICATION FILED NOV. 21, 1906.
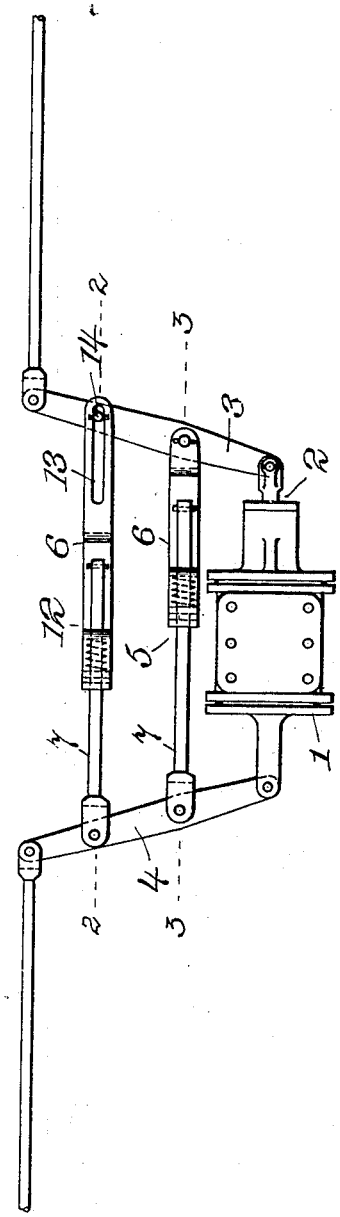
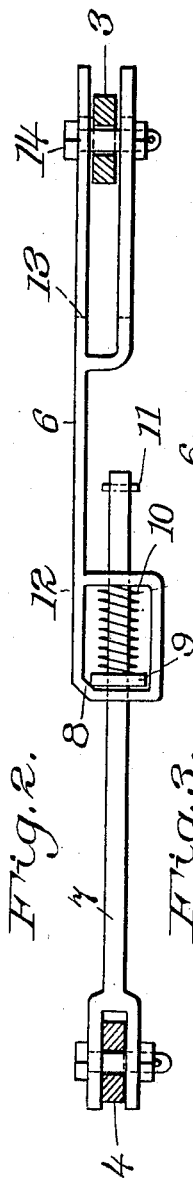
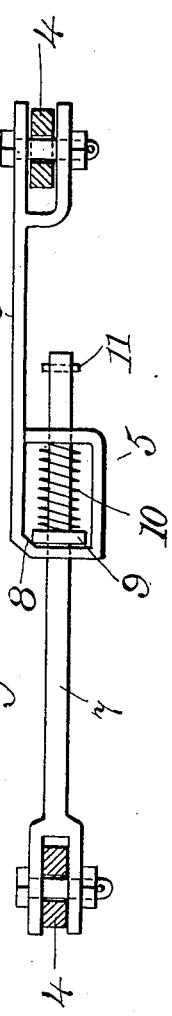
Witnesses
Inventor

UNITED STATES PATENT OFFICE.

AUGUSTUS PARKER-SMITH, OF NEW YORK, N. Y., ASSIGNOR TO ATLAS SLACK ADJUSTER COMPANY, A CORPORATION OF NEW YORK.

SLACK-ADJUSTER.

No. 860,238.   Specification of Letters Patent.   Patented July 16, 1907.

Application filed November 21, 1906. Serial No. 344,431.

*To all whom it may concern:*

Be it known that I, AUGUSTUS PARKER-SMITH, a citizen of the United States of America, and a resident of the borough of Manhattan, city, county, and State of New York, have invented certain new and useful Improvements in Slack-Adjusters, of which the following is a specification.

My invention relates to automatic slack adjuster mechanism for railway brakes and is designed to adjust the brake rigging so as to maintain approximately uniform travel of the piston in the brake cylinder no matter to what extent the brake shoes may wear down or the brake beams and other portions of the brake rigging bend under the stress of repeated brake applications.
The best form of apparatus embodying my invention at present known to me is shown in the accompanying sheet of drawings in which:

Figure 1 is a plan view of a portion of the standard brake rigging with my invention applied. Fig. 2 is an enlarged sectional view taken on line 2—2 of Fig. 1, and Fig. 3 is a similar view on line 3—3 of Fig. 1.

Throughout the drawings like reference figures indicate like parts.

1 is the usual brake cylinder, 2 the piston rod, 3 the right hand brake lever, 4 the left hand brake lever, and 5 the tie-rod connecting the same. This tie-rod is made so that it can telescope, being composed of the stirrup portion 6 pivoted to the right hand brake lever and the portion 7 pivoted to the left hand brake lever, which passes through perforations in the stirrup, as clearly shown in Fig. 3. The stirrup 6 has a generally rectangular shape with one corner beveled off, as shown at 8, to form the fulcrum for the loose clutch dog 9, which is perforated and mounted on the portion 7 of the tie-rod.

10 is a spring compressed between the clutch dog and one end of the stirrup, and 11 is any convenient form of stop to prevent the complete withdrawal of the section 7 from the stirrup.
The second tie-rod 12 is made similar to the tie-rod 6, except that it is provided with some form of lost motion connection to one or the other of the brake levers. As shown, this lost motion connection consists of the slots 13 in which the pin 14 in the brake lever 3 moves.
The operation of my invention is as follows: The slot 13 is made of such length as to permit the pin 14 to travel back and forth therein without striking the ends during any ordinary travel of the piston in the air brake cylinder. When the piston rod is projected any distance in excess of this predetermined travel, the pin 14 will strike the inner end of the slot 13 and force the second telescoping tie-rod 12 to shorten up a distance proportional to this excess travel. On the release of the brakes, the piston returning home, the pin 14 will strike the outer end of the slot 13 at the end of the return stroke and the tie-rod 5 will be shortened up a corresponding distance. After each shortening of either tie-rod, the holding friction clutches will adjust themselves to the new position, and prevent any lengthening of the tie-rod.

The advantages of my invention include the positive and exact action of the friction clutches on the telescoping tie-rods; the cheapness and simplicity of the construction and the few number of parts required. The friction clutches are much superior in their action to ratchet and pawl constructions, as they are simpler, stronger and are not affected by the accumulation of dirt, rust or ice. Friction clutches also grip positively at any point and there is no tendency for them to skip, as occurs with ratchet mechanisms where the pawl may stop just short of dropping over one tooth and on the sudden application of force will jump across, striking the next tooth near the outer end and slip by or break the tooth.

It is evident that other forms of friction clutch might be substituted for that shown and the parts differently arranged without departing from the principle of my invention.

Having, therefore, described my invention, I claim:

1. In a slack adjusting device for railway brakes, the combination with the usual cylinder, piston and brake levers, of a telescoping tie-rod connecting said brake levers provided with a friction clutch which permits said tie-rod to be shortened but normally prevents its being lengthened, and means for automatically shortening said tie-rod by an amount corresponding to any excess travel of the piston beyond a predetermined amount, said friction clutch comprising a stirrup formed on the inner end of one portion of the tie-rod, and perforated for the passage of the other portion of the tie-rod, a clutch dog mounted in said stirrup and grasping the other portion of the tie-rod, and a spring normally holding said clutch dog in gripping position.

2. In a slack adjusting device for railway brakes, the combination with the usual cylinder, piston and brake levers, of a telescoping tie-rod connecting said brake levers provided with a friction clutch which permits said tie-rod to be shortened but normally prevents its being lengthened, and means for automatically shortening said tie-rod by an amount corresponding to any excess travel of the piston beyond a predetermined amount, said friction clutch comprising a rectangular stirrup formed on the inner end of one portion of the tie-rod, perforated for the passage of the other portion of the tie-rod, and having one corner beveled off, a perforated clutch dog mounted on the said other portion of the tie-rod within the stirrup formed on the first portion and having one end bearing against the beveled portion as a fulcrum, and a spring confined between said clutch dog and one end of the stirrup.

3. In a slack adjusting device for railway brakes, the combination with the usual cylinder, piston and brake levers, of a telescoping tie-rod connecting said brake levers provided with a friction clutch which permits said tie-rod to be shortened but normally prevents its being lengthened, and means for automatically shortening said tie-rod by an amount corresponding to any excess travel of the piston beyond a predetermined amount, said friction clutch comprising a rectangular stirrup formed on the inner end of one portion of the tie-rod, perforated for the passage of the other portion of the tie-rod, and having one corner beveled off, a perforated clutch dog mounted on the said other portion of the tie-rod within the stirrup formed on the first portion and having one end bearing against the beveled portion as a fulcrum, and a spring confined between said clutch dog and that end of the stirrup opposite to the end which has one of its corners beveled off.

Signed at New York, N. Y., this 19th day of November 1906.

A. PARKER-SMITH.

Witnesses:
    MANUEL C. LOPEZ,
    M. G. CRAWFORD.